United States Patent [19]

MacFarland

[11] 4,084,948
[45] Apr. 18, 1978

[54] VACUUM CLEANER FILTER BAG ASSEMBLY

[75] Inventor: Charles H. MacFarland, Rocky River, Ohio

[73] Assignee: The Scott & Fetzer Company, Cleveland, Ohio

[21] Appl. No.: 750,608

[22] Filed: Dec. 15, 1976

[51] Int. Cl.$^2$ ............................................. B01D 46/02
[52] U.S. Cl. ........................................ 55/366; 55/371; 55/374; 55/380; 55/473; 15/351
[58] Field of Search ................. 55/361, 364, 359, 365, 55/366, 367–372, 374–377, 380–382, 473; 15/351

[56] References Cited

U.S. PATENT DOCUMENTS

| | | | |
|---|---|---|---|
| 1,835,770 | 12/1931 | Gasner et al. | 55/364 |
| 1,944,270 | 1/1934 | Reeve | 55/366 |
| 2,007,518 | 7/1935 | Calhoun | 55/366 |
| 2,122,568 | 7/1938 | Gasner et al. | 55/371 |
| 2,174,730 | 10/1939 | White | 55/366 |
| 2,755,884 | 7/1956 | Pavlic | 55/375 |
| 2,948,354 | 8/1960 | Hammink | 55/369 |
| 3,728,847 | 4/1973 | Howard et al. | 55/371 |
| 3,995,414 | 12/1976 | Kerr et al. | 55/364 |

Primary Examiner—Bernard Nozick
Attorney, Agent, or Firm—McNenny, Pearne, Gordon, Gail, Dickinson & Schiller

[57] ABSTRACT

A filter bag assembly for a vacuum cleaner is disclosed. The assembly includes an elongated, relatively rigid, hollow tube coupled at one end to the exhaust of a vacuum cleaner. The tube runs upwardly along the handle of the vacuum cleaner and is attached at its other end to a porous filter bag. The filter bag runs downwardly along the rigid tube and has an open end closed by a nonporous dirt-collecting bag. The tube, the porous bag, and the nonporous bag are encased in an envelope so that the nonporous bag is held in a collapsed or stored condition at the end of the filter bag during normal use of the cleaner. To empty the filter bag of its collected dirt, the envelope is opened to expose the nonporous bag and to permit the dirt in the filter bag to drop downwardly into the nonporous bag. The vacuum cleaner may be turned on and off a number of times to distend the bag and dislodge dirt from the filter bag during the emptying operation.

4 Claims, 7 Drawing Figures

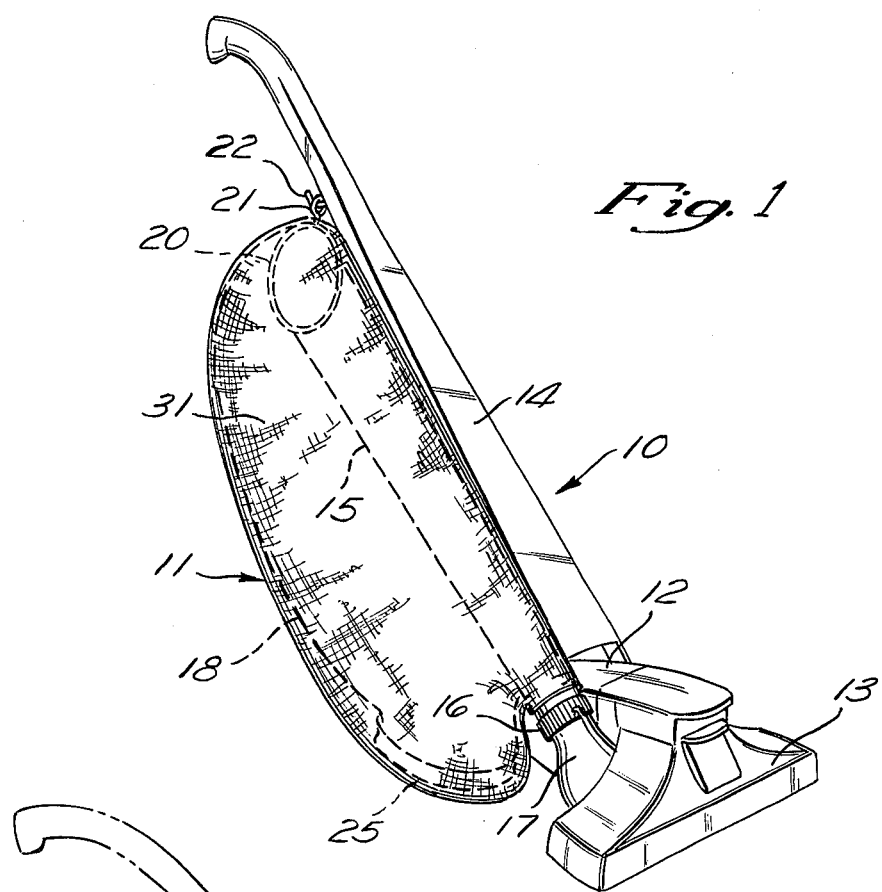
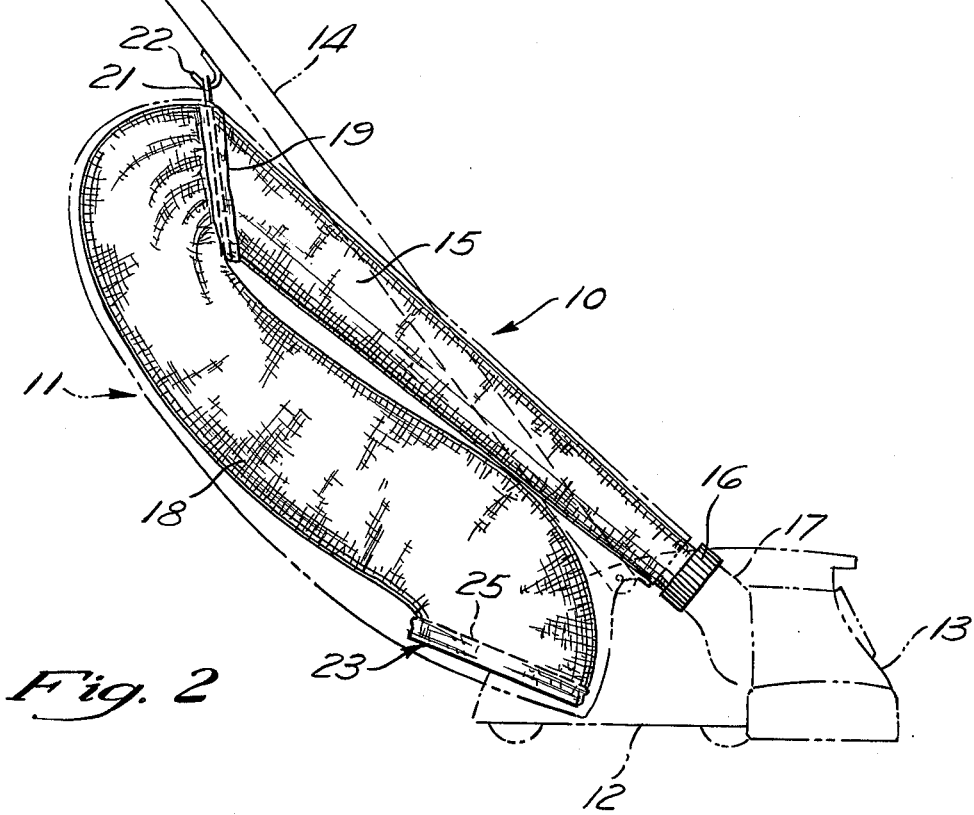

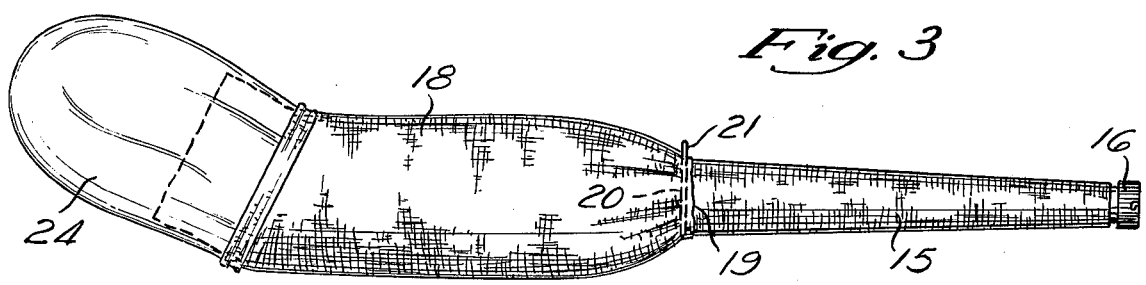
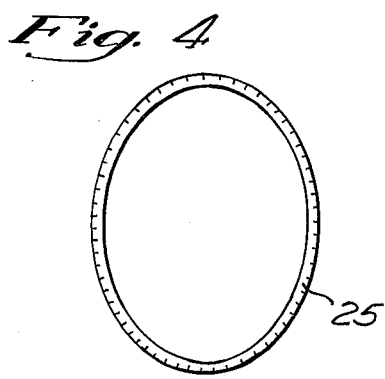
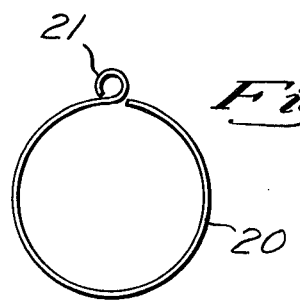
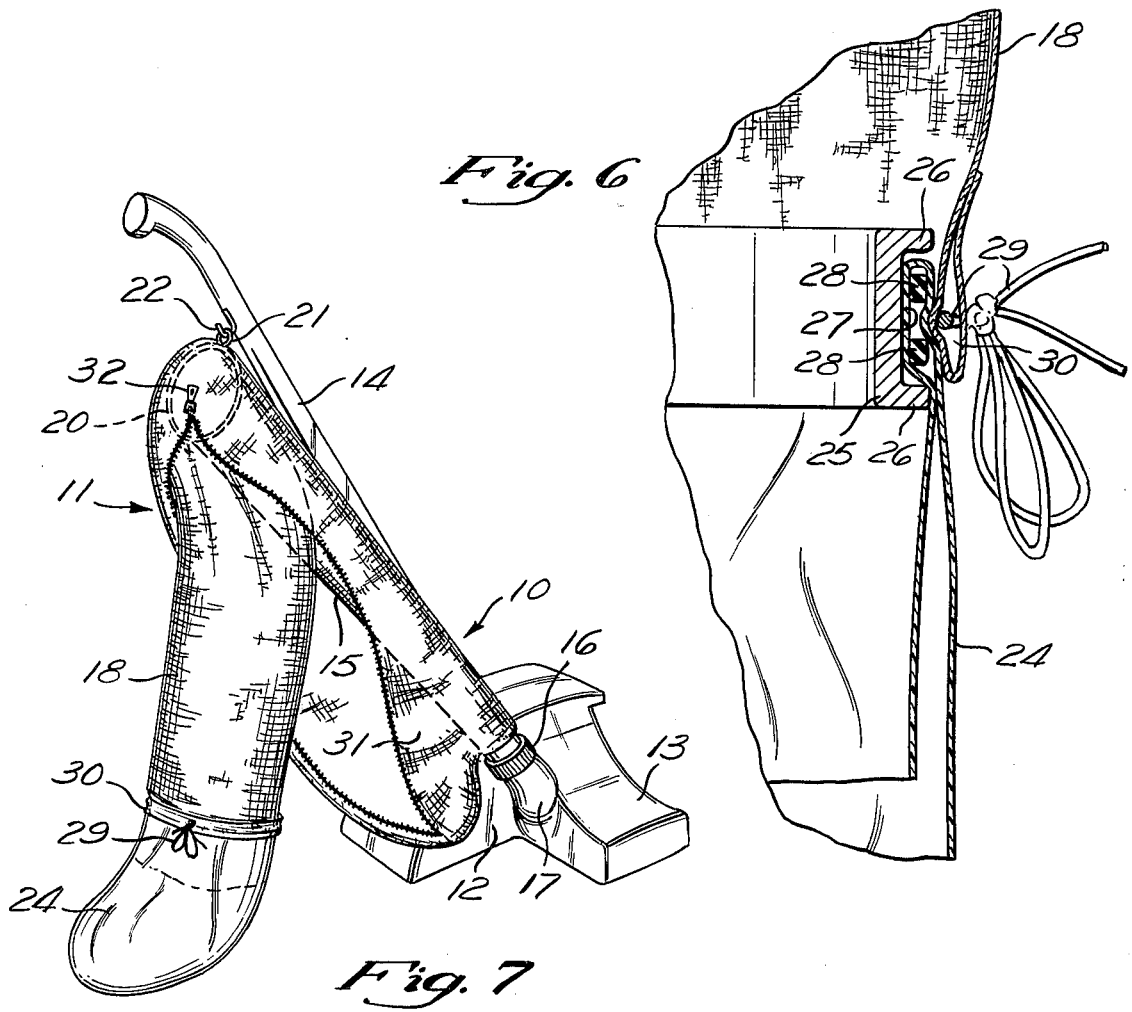

VACUUM CLEANER FILTER BAG ASSEMBLY

BACKGROUND OF THE INVENTION

This invention relates to vacuum cleaners and, more particularly, to an improved filter bag assembly for vacuum cleaners. Upright vacuum cleaners for domestic use generally have either a permanent cloth filter bag or a disposable paper bag. Those cleaners having a permanent cloth filter bag have certain advantages, since the filter capacity, and therefore the dirt-collecting capacity of the bag, are much greater than those cleaners having a disposable paper filter. The major drawback of the permanent, nondisposable filter is the fact that the bag must be dumped onto newspaper or into a paper bag, and this is an objectionable operation, particularly to an allergic person.

SUMMARY OF THE INVENTION

This invention overcomes the disadvantages of prior art filter bag assemblies, while retaining the desirable aspects thereof. The filtering action is accomplished by a permanent cloth bag, and the dirt is transferred to a nonporous trash bag which is associated with the cloth bag but which is removable therefrom for disposal of the dirt. More specifically, the filter bag assembly comprises a relatively rigid, hollow tube coupled at one end to the exhaust outlet of the vacuum cleaner. The tube runs upwardly along the handle of the vacuum cleaner and has a relatively wide mouth fixed to and in communication with a cloth filter bag which is folded so that it extends downwardly along the extent of the relatively rigid tube. The end of the filter bag has a nonporous dirt-collecting bag removably attached thereto and, during use of the cleaner, the nonporous dirt-collecting bag is collapsed at the mouth of the cloth filter bag in a stored position. The relatively rigid hollow tube, the cloth filter bag, and the nonporous dirt-collecting bag are all encased in a perforated envelope. The envelope is openable to expose at least the nonporous bag so that when the cloth bag needs to be emptied, the nonporous bag may be exposed and extended to permit the dirt to drop downwardly into the nonporous bag. To aid in this operation, the vacuum cleaner may be turned on and off a number of times to distend the bag and dislodge dirt from the cloth filter bag.

BRIEF DESCRIPTION OF THE DRAWINGS

FIG. 1 is a perspective view of a vacuum cleaner having a filter bag assembly according to this invention;

FIG. 2 is a side elevational view of the vacuum cleaner, with certain portions of the filter bag assembly shown in phantom to illustrate the condition of the filter bag assembly during normal use of the vacuum cleaner;

FIG. 3 is an elevational view of the filter bag assembly removed from the vacuum cleaner;

FIG. 4 is an elevational view of a coupling ring provided between the cloth filter bag and the nonporous trash bag;

FIG. 5 is an elevational view of a ring which is employed to attach the filter bag assembly to the handle of the cleaner;

FIG. 6 is a cross sectional view illustrating the attachment between the cloth filter bag and the nonporous trash bag; and FIG. 7 is a perspective view of the vacuum cleaner according to this invention, showing the filter bag assembly in a dirt disposal condition.

DETAILED DESCRIPTION OF THE INVENTION

Referring now to the drawings, there is illustrated a vacuum cleaner 10 having a filter bag assembly 11 according to this invention. The vacuum cleaner 10 is a standard, on-the-floor upright vacuum cleaner and has a fan casing 12, a dirt-collecting nozzle 13, and a handle 14 pivotally attached to the fan casing 12.

The bag assembly 11 includes a relatively rigid tube 15 which may be thin, impervious vinyl with a nylon mesh reinforcement. One open end of the tube 15 is provided with a coupling 16, which may be the standard bayonet-type coupling usually employed on vacuum cleaners. The coupling 16 is connected to an exhaust nozzle 17 of the vacuum cleaner 10, which in turn communicates with the fan casing 12.

The other end of the tube 15 is joined to a porous cloth filter bag 18 and is in fluid communication with that bag. The bag 18 is provided with a seam 19 into which a mounting ring 20 is sewn. The ring 20 has an eyelet 21 which is attached to a hook 22 on the upper portion of the handle 14.

The bag 18 extends downwardly along the tube 15 and terminates at an open mouth 23. As may best be seen in FIG. 6, a flexible, nonporous trash or dirt-collecting bag 24 cooperates with the open mouth of the bag 18 to close that bag during normal use. The bag 24 may be a conventional trash bag made from polyethylene, and is preferably transparent so that the mounting procedure can be observed. To mount the bag 24 on the bag 18, an elliptical aluminum ring 25 is provided. The ring 25 has flanges 26 which define a channel 27 therebetween, and the flanges 26 are notched. The bag 24 is attached to the ring 25 by rubber bands, and the top of the bag is folded over the rubber bands and into the bag to minimize spillage when the bag is removed for disposal. As may be noted in FIG. 6, the rubber bands 28 securely fasten the bag 24 within the channel 27 and the notches aid in this operation by gripping the rubber band as it is slipped over the flange. After the bag is attached to the ring 25, the ring 25 is inserted in the open mouth of the bag 18. The ring and bag assembly is held at the open mouth of the bag 18 by a drawstring 29, which extends through a seam 30 at the mouth of the bag 18.

During normal use, the bag 24 is crushed into the mouth of the bag 18 and the assembly, which comprises the tube 15, the bag 18, and the bag 24, is encased in a perforate envelope or cover 31, which may be fabricated from vinyl. The cover 31 is closed by a zipper 32 or the like. To empty the bag 18, the cover 31 is opened and the bag 24 is inflated by turning the vacuum cleaner on to inflate the bag 24 so that the dirt from the bag 18 may drop into the bag 24. If desired, the cleaning operation may be aided by a pocket sewn into the bag 18, such as the pocket shown in U.S. Pat. No. 2,948,354, the subject matter of which is incorporated herein by reference.

The invention is not restricted to the slavish imitation of each and every detail set forth above. Obviously, devices may be provided which change, eliminate, or add certain specific details without departing from the scope of the invention.

What is claimed is:

1. A filter bag assembly for a vacuum cleaner, comprising an elongated, relatively rigid, hollow tube, a coupling member at one end of said tube adapted to be connected to the exhaust outlet of a vacuum cleaner, a porous filter bag having open ends with one end fixed to the end of said tube, a flexible, nonporous bag having an open mouth communicating with the other end of said filter bag to close the filter bag, a porous envelope having an inlet and encasing said hollow tube, said porous bag, and said nonporous bag, said envelope holding said nonporous bag in a collapsed condition at said other end of said porous bag and provided with an access opening and being openable to expose at least said nonporous bag for removal of said nonporous bag together with dirt collected therein.

2. A filter bag assembly according to claim 1, wherein said nonporous bag is plastic.

3. A filter bag assembly according to claim 1, wherein the open mouth of said nonporous bag has elastic band means associated therewith, said elastic band means tightly embracing a rigid ring, the open end of said porous bag embracing said rigid ring.

4. In a vacuum cleaner having a fan casing, a blower exhaust nozzle on said fan casing, and an elongated upright handle extending from said casing, in combination therewith the improvement comprising an elongated, relatively rigid, hollow tube, a coupling member at one end of said tube coupled to said exhaust nozzle, said tube being attached to and extending along said handle, a porous filter bag having open ends, with one end fixed to the other end of said tube, said porous bag extending downwardly along said tube, a flexible nonporous bag communicating with and enclosing the other end of said porous bag, a porous envelope having an inlet and encasing said tube, said porous bag, and said nonporous bag, said envelope holding said nonporous bag in a collapsed condition at said other end of said porous bag and provided with an access opening and being openable to expose at least said nonporous bag for removal of said nonporous bag together with dirt collected therein.

* * * * *